(No Model.) 8 Sheets—Sheet 1.
H. W. FAIRBRASS.
CENTERBOARD.

No. 599,097. Patented Feb. 15, 1898.

Witnesses:
E. B. Bolton

Inventor:
Herbert Wynne Fairbrass
By Richards
his Attorneys.

(No Model.) 8 Sheets—Sheet 2.
H. W. FAIRBRASS.
CENTERBOARD.
No. 599,097. Patented Feb. 15, 1898.
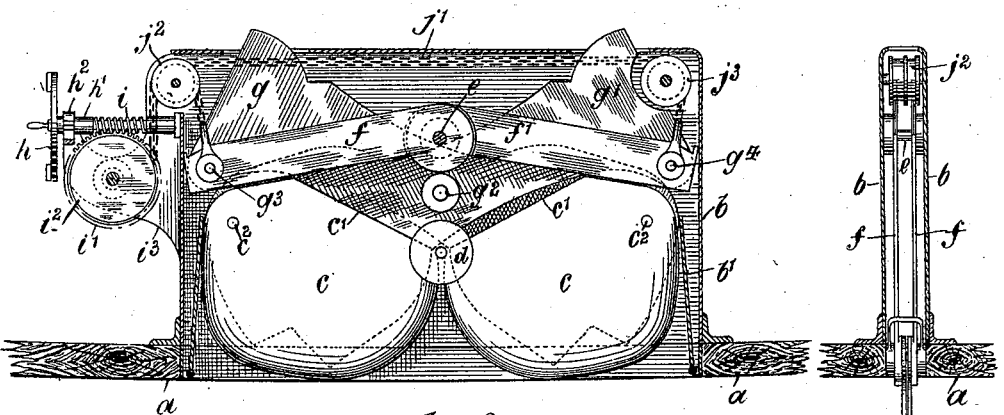
Fig. 2.
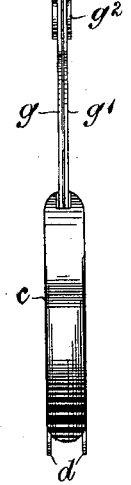
Fig. 4.
Fig. 3.
Witnesses:
E. K. Bolton
Inventor:
Herbert Wynne Fairbrass
By Richards
his Attorneys.

(No Model.) 8 Sheets—Sheet 3.

H. W. FAIRBRASS.
CENTERBOARD.

No. 599,097. Patented Feb. 15, 1898.

Witnesses.
E. B. Bolton

Inventor:
Herbert Wynne Fairbrass
By Richards
his Attorneys.

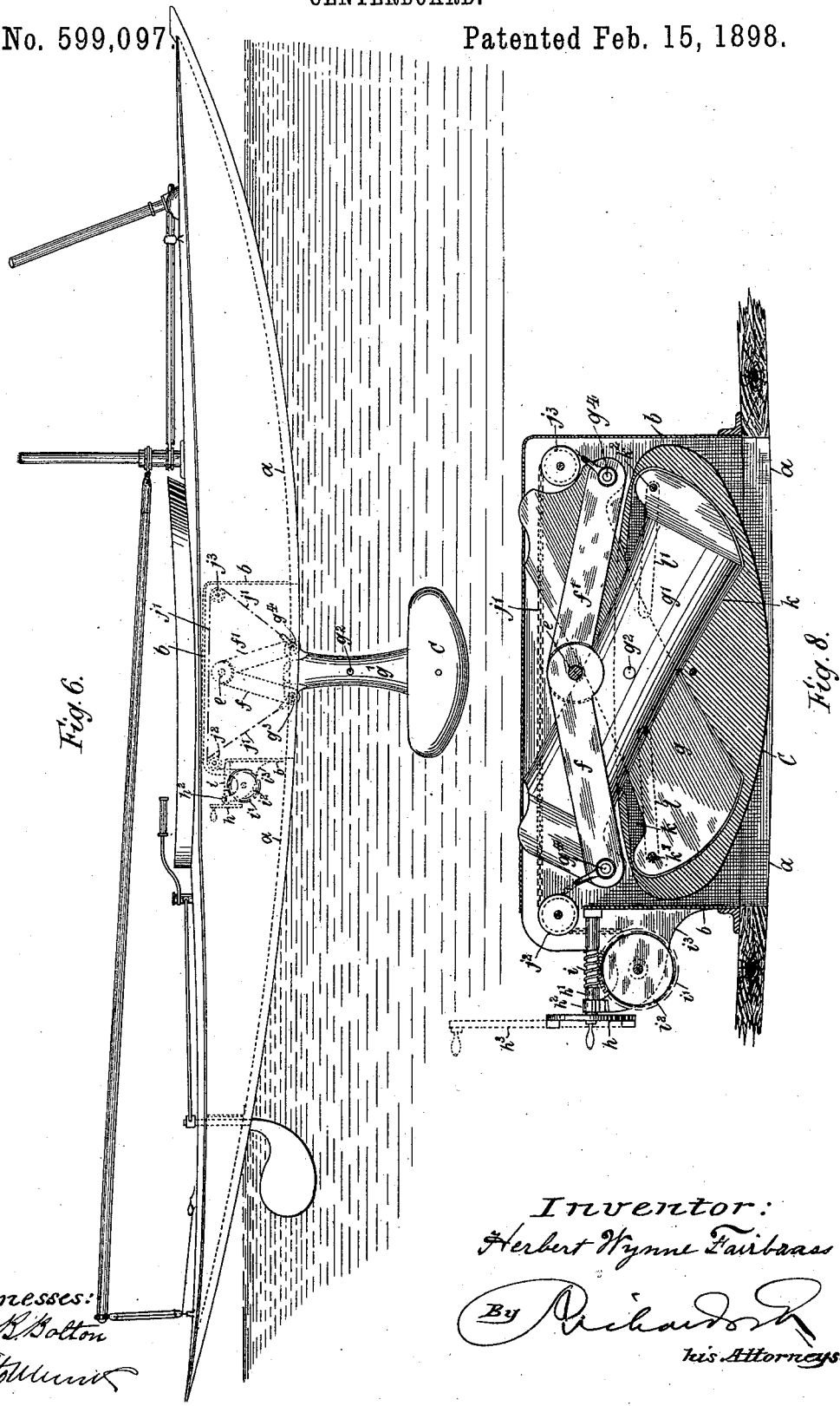

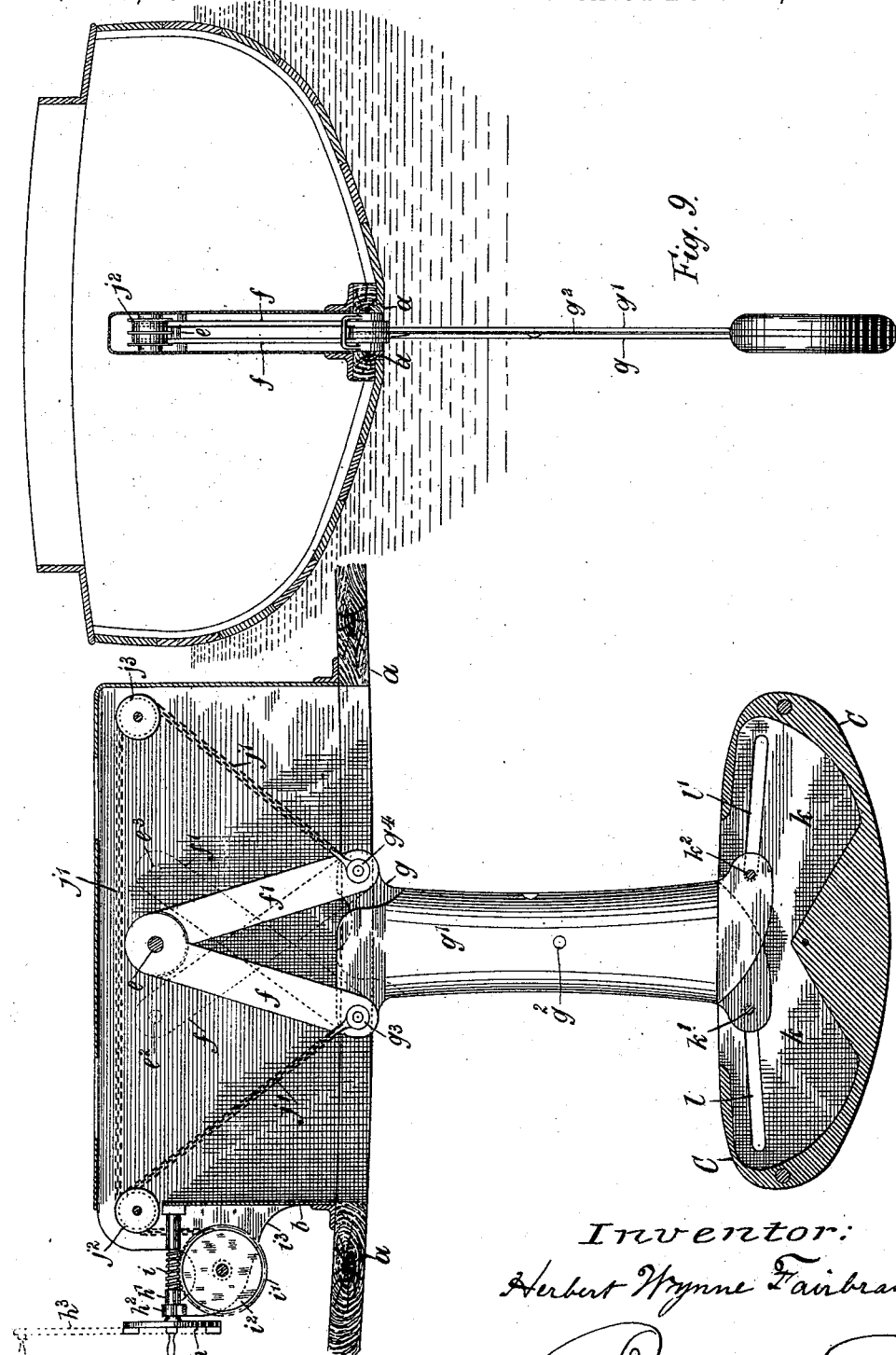

(No Model.) 8 Sheets—Sheet 6.

H. W. FAIRBRASS.
CENTERBOARD.

No. 599,097. Patented Feb. 15, 1898.

Witnesses:
E. B. Bolton

Inventor:
Herbert Wynne Fairbrass
By Richardson
his Attorneys

THE NORRIS PETERS CO., PHOTO-LITHO., WASHINGTON, D. C.

(No Model.)   8 Sheets—Sheet 7.
H. W. FAIRBRASS
CENTERBOARD.
No. 599,097.   Patented Feb. 15, 1898.

Witnesses:
E. B. Bolton

Inventor:
Herbert Wynne Fairbrass
By Richards
his Attorneys.

(No Model.) 8 Sheets—Sheet 8.

H. W. FAIRBRASS.
CENTERBOARD.

No. 599,097. Patented Feb. 15, 1898.

Witnesses:
E. B. Bolton

Inventor:
Herbert Wynne Fairbrass
By Richardson
his Attorneys

UNITED STATES PATENT OFFICE.

HERBERT WYNNE FAIRBRASS, OF LONDON, ENGLAND.

CENTERBOARD.

SPECIFICATION forming part of Letters Patent No. 599,097, dated February 15, 1898.

Application filed July 21, 1897. Serial No. 645,435. (No model.) Patented in England February 7, 1894, No. 2,661.

*To all whom it may concern:*

Be it known that I, HERBERT WYNNE FAIRBRASS, a subject of the Queen of the United Kingdom of Great Britain and Ireland, residing at No. 47 Haymarket, London, England, have invented certain new and useful Improvements in and Connected with Drop-Keels, Centerboards, and the Like, (for which I have obtained the following patent: in Great Britain and Ireland, No. 2,661, dated February 7, 1894;) and I do hereby declare that the following is a full, clear, and exact description of the invention, reference being made to the accompanying drawings, which are to be taken as part of this specification and read therewith, and one which will enable others skilled in the art to which it appertains to make and use the same.

My invention relates to improvements in and connected with drop-keels, centerboards, and the like; and it consists of improvements in the keels themselves, in the centerboards, and in the gear for lowering either keels or centerboards into the water and for housing them again.

The invention is particularly applicable to all vessels of limited stability, such as torpedo-boats.

Figures 1, 10:
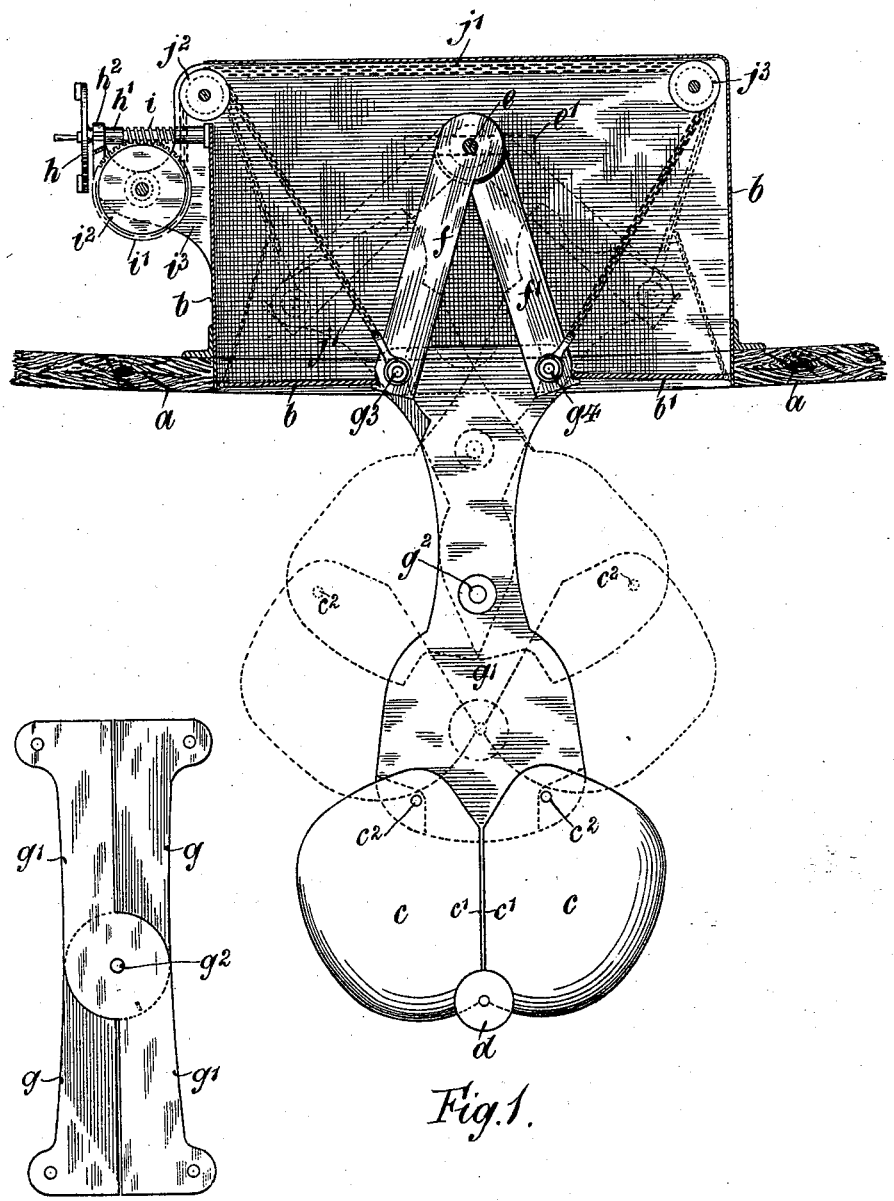
Figure 5:
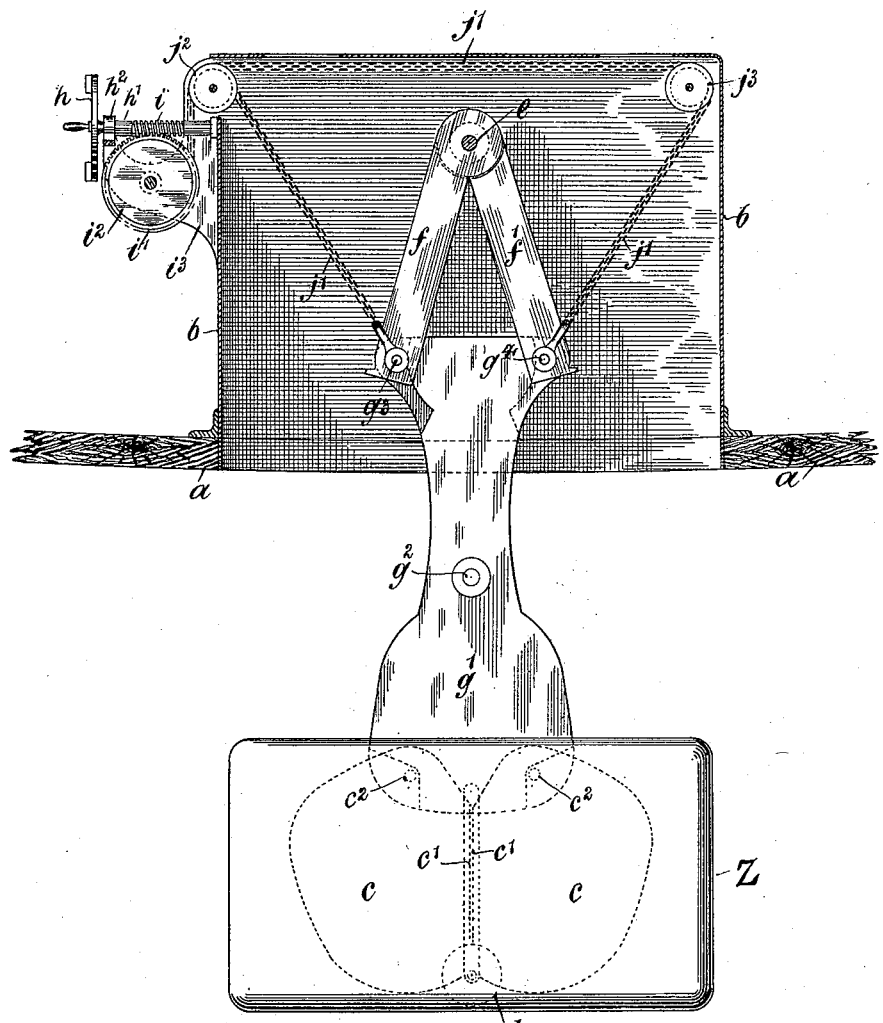
Figure 11:
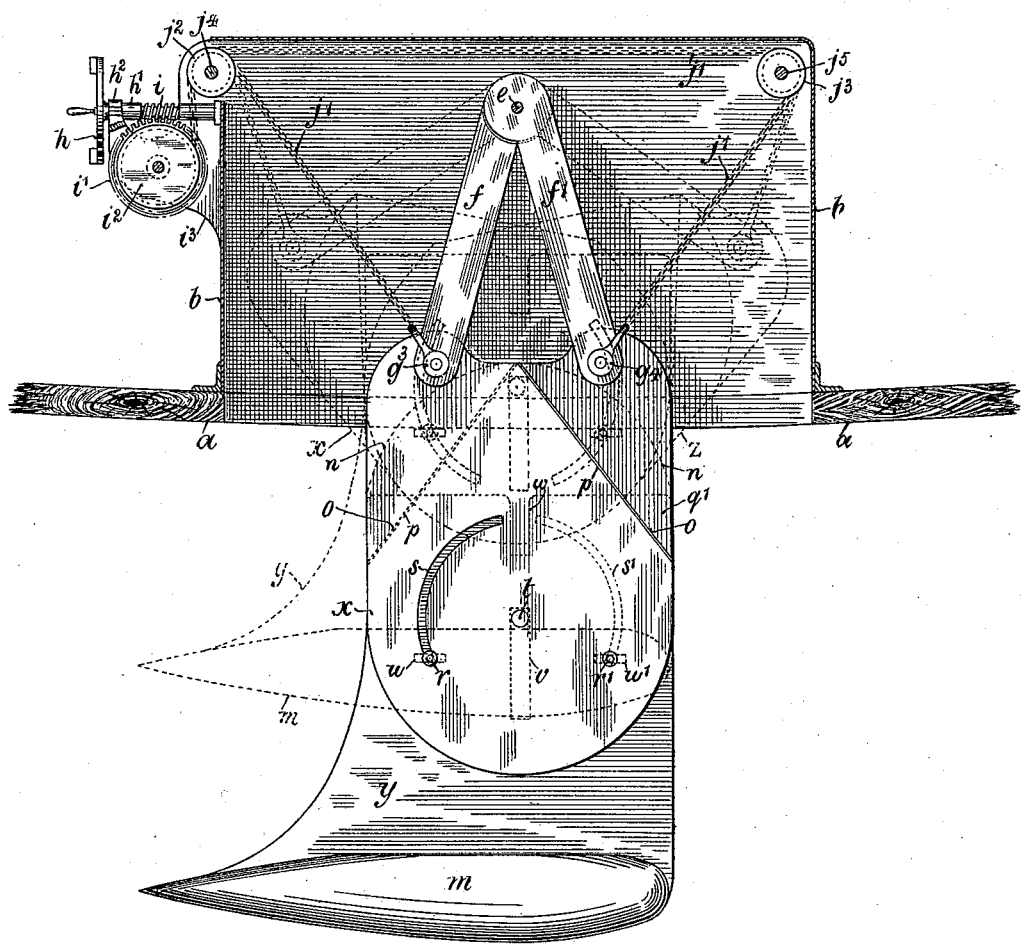
Figure 12:
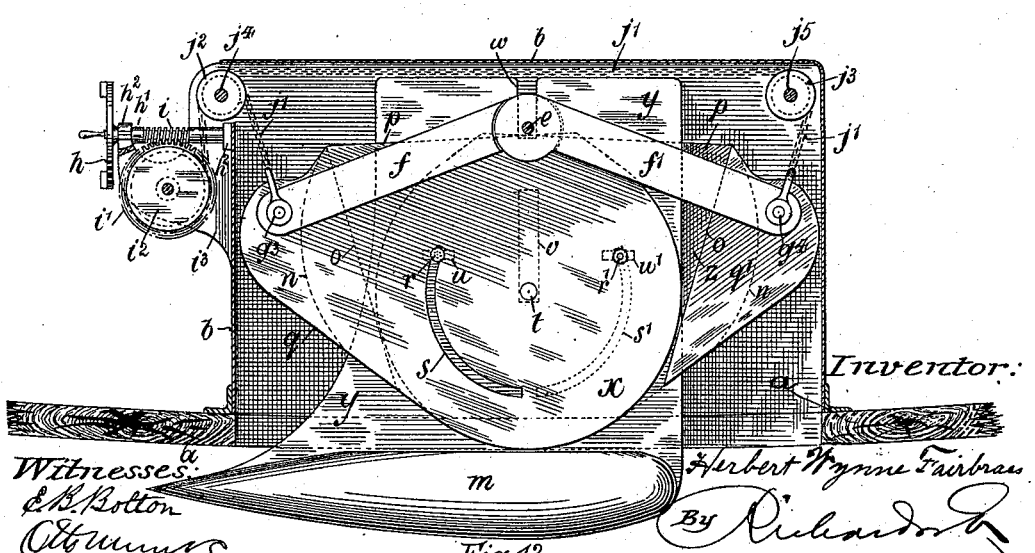
Figure 13:
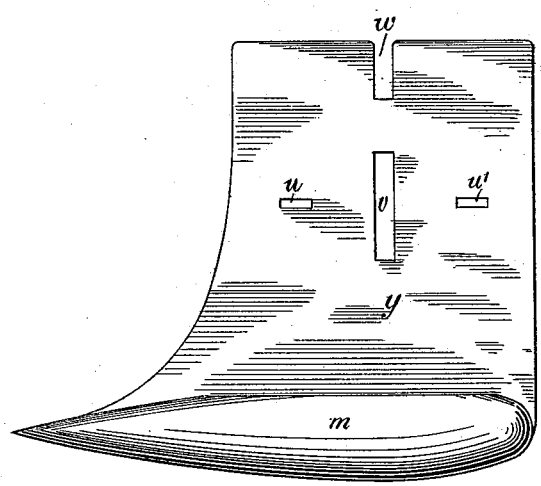
Figure 14:
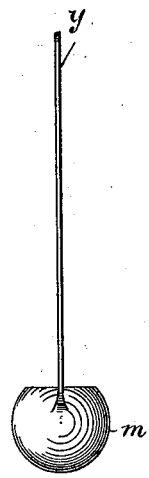
Figure 15:
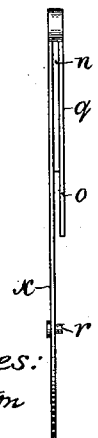

Referring to the accompanying drawings, which are to be taken as part of this specification and read therewith, Figure 1 is a side elevation of a two-part hinged drop-keel and its lowering and housing gear constructed according to my invention. The drop-keel is shown by the full lines as lowered into the water as far as it will drop and by the dotted lines as suspended nearer to the bottom of the boat. Fig. 2 is a side elevation of the same keel and mechanism, showing them housed or inboard. Fig. 3 is a part sectional end elevation corresponding with the full lines of Fig. 1. Fig. 4 is a plan of Fig. 2. Fig. 5 is a side elevation illustrating the use of a cover for a two-part hinged keel. Fig. 6 is a side elevation of a boat fitted with a single piece or one-part drop-keel, made according to my invention. Fig. 7 is a sectional side elevation of the invention illustrated in Fig. 6, but on a larger scale. Fig. 8 is a sectional side elevation on the same scale as Fig. 7, showing the keel housed or inboard. Fig. 9 is a sectional end elevation corresponding with Fig. 7. Fig. 10 is a detail illustrating a modified construction of center plates. Fig. 11 is a side elevation of a modified construction of centerboard with a torpedo-shaped one-part drop-keel, showing the latter lowered into the water as far as it will drop. Fig. 12 is a side elevation showing the same centerboard and drop-keel housed or inboard. Fig. 13 is a detail side elevation, and Fig. 14 a detail end elevation, of the middle member of the modified construction of centerboard illustrated in Figs. 11 and 12. Fig. 15 is a detail end elevation, and Fig. 16 a detail side elevation, of one of the outer members of the same modified construction. Fig. 17 is a side elevation of a boat fitted with the centerboard and drop-keel illustrated in Figs. 11 to 16, showing them lowered into the water.

*a a* are portions of the usual keel-timbers, cut away or slotted, as heretofore, for the passage through them of the drop-keel and the centerboard.

*b* is the trunk in which both drop-keel and centerboard are housed when they are inboard. It stands upon and is securely fastened to the keel-timbers *a a*. The mouth of it may be fitted with pivoted flaps *b' b'*, adapted to close it when the keel is dropped and to swing back as the drop-keel and the gear are raised.

Referring to Figs. 1 to 4, *c c* are the two parts of the drop-keel, and they, together with the rule-joint *d*, by which they are hinged to each other, constitute my improved two-part hinged drop-keel. The pivot of the rule-joint *d* is fixed below the center of gravity in the drop-keel and preferably at the bottom and adjacent corners of the two parts *c c*. The two adjacent edges *c' c'* of these latter are both rectilinear and radial to the axis of the rule-joint *d*, so that when they are in touch with each other the two parts *c c* form, practically, one continuous keel, as indicated by the full lines in Fig. 1. To make it still more certain that the two parts *c c* shall when they are in touch with each other present unbroken side surfaces to the water, and also to prevent the growth of weeds upon the said parts, a cover *z* is provided. This cover is closed at the bottom and both ends, but is partially open along the top to permit of the centerboard passing through.

$e$ is a bolt passing athwartships from one side of the trunk $b$ to the other. It is either fixed to the trunk in such a way as to be capable of independent motion, as indicated by the respective full lines, or it may be mounted in horizontal slots $e'$, formed in the sides of the trunk, so as to be movable fore and aft, as indicated by the dotted lines in Fig. 1. This bolt constitutes the point of suspension for the drop-keel, the centerboard, and the lowering and housing gear. This housing and lowering gear consists of a four-lever lazy-tongs. The two levers $f f'$ are of equal lengths and both have their fulcra in the bolt $e$ when only one such bolt is used; but I may, if preferred, use two bolts $e^2 e^3$, (see Fig. 7,) one for each lever. Each lever $f f'$ is duplex—i. e., it consists of a pair of parallel bars. $g g'$ are a second pair of levers, (elsewhere in this specification referred to as the "center plates" or together as the "centerboard.") They also are of equal length and have their fulcra in a pivot $g^2$, which is common to them both and situated preferably midway of their length. Their upper ends are pivoted to the respective lower ends of the levers $f f'$ by pivots $g^3 g^4$. Their lower ends are pivoted by pivots $c^2 c^2$ to the upper and respectively adjacent corners of the parts $c\, c$.

The center plates $g g'$ are adapted to move over each other scissorwise or up to and away from each other, as indicated in Fig. 10. The upper ends of these center plates stand between, their upper portions being thereby adapted to move between, the two bars of the respective levers $f f'$. In cross-section each plate is of the proper shape for presenting a sharp edge to the water. Each part $c\, c$ is slotted in the plane of the respective center plate in order that the drop-keel may as it is being housed pass over the ends of the center plates $g g'$.

A mechanism for working the housing and lowering gear above described is provided. My invention does not limit me as to the type or the constructional details of this mechanism. The one illustrated satisfies every requirement of the invention. It consists of a wheel $h$, fast on a shaft $h'$, journaled in bearings $h^2$. $i$ is a worm fast on the shaft $h'$ and engaging with a worm-wheel $i'$, fast on the axis of and between two drums $i^2 i^2$, journaled in brackets $i^3$, projecting from one end of the trunk $b$. Each of the said drums has made fast to its periphery an end of one of the two suspension-chains $j' j'$. The latter are led over antifriction-pulleys $j^2 j^3$, respectively, which are supported on fixed axes in the trunk and then made fast by their free ends to the lower ends of the levers $f f'$, respectively. The wheel $h$ may be fitted with a radially-adjustable handle $h^3$, as indicated by the dotted lines in Figs. 7 and 8.

The drop-keel is lowered by paying out the suspension-chains $j' j'$, the weight of the former carrying it down into the water. It is lifted or housed by winding the chains in less or more, as may be required.

When a boat—for example, a torpedo-boat or a large yacht—has a deep draft, the point of suspension—the bolt $e$—is high, thereby keeping the centerboard inboard of the boat even when the drop-keel is out. Under such circumstances the shape of the drop-keel itself is modified in the direction of making it about twice as deep from top to bottom as it may be long fore and aft.

Instead of making the drop-keel in two parts pivoted together, as already described, the present invention permits of its manufacture in one piece, as heretofore, and it makes special provision (consisting of the central cavity, slots, and studs next described) for the connection of the lower ends of the center plates to the drop-keel to accommodate the necessary motion of the said ends away from and toward each other.

Referring to Figs. 6 to 9, C is a one-part drop-keel. $k$ is a longitudinal cavity formed midway of the two side surfaces. In each inner side of the cavity are formed two slots $l\, l'$. These stand symmetrically with reference to each other and exactly opposite those in the opposite side of the cavity, respectively. $k' k'$ are two studs projecting from opposite sides of the lower end of the center plate $g$ and engaging in the slots $l\, l'$, and $k^2 k^2$ are studs projecting likewise from the center plate $g'$ and engaging in the slots $l' l'$.

It should be noted that the respective dimensions of the levers $f f'$ and the center plates $g g'$ are adjusted so as to make the pivots $g^3 g^4$ stand between the keel-timbers $a\, a$ when the drop-keel is at its lowest level. The object of this adjustment is to provide for the junction of the levers $f f'$ with the levers $g g'$, being supported by the said keel-timbers against athwartship strains.

The object of the modification illustrated in Figs. 11 to 17 is to provide a wider centerboard than the construction previously described is adapted (without increasing the height of the trunk above the keel-timbers $a\, a$) to yield.

The modified centerboard consists of three plates $x\, y\, z$. These are of equal width and depth and approximately rectangular in shape.

If there is a drop-keel combined with the centerboard, it is made fast to the middle plate $y$, along the bottom edge thereof, as illustrated in Figs. 11 to 14 and 17, the shape of the bottom portion of the said plate being modified as may be necessary to make a workmanlike junction with the top of the keel. It must be understood that the presence of the drop-keel is not a feature of the present invention. Whether it is itself pulled into the trunk when the centerboard is housed or whether it remains just outside depends upon its own diameter and length.

$w$ is a vertical slot cut down the middle of the plate $y$ from the top edge to enable it to clear the bolt $e$ as it is being hauled up to the top of the trunk.

$v$ is a vertical slot in the center of the plate $y$ for the stud, upon which both the outer plates $x$ and $z$ turn to pass through and move up and down in.

$u\ u'$ are two horizontal slots. They are of the same size and stand symmetrically in the plate $y$ with reference to the vertical slot $v$, each one being alined with the middle of the latter and half-way between it and the respective side of the plate, as illustrated in Fig. 13.

$x\ z$ are the two outer plates of the improved centerboard. They hang one on each side of the plate $y$ and parallel therewith. They discharge in part in the present invention the functions of the levers or plates $g\ g'$. For that reason the bottom end of the lever $f$ is pivotally connected to the top outer corner of the plate $x$ by the bolt $g^3$, while the top outer corner of the plate $z$ and the bottom end of the lever $f'$ are similarly connected by the bolt $g^4$.

Figure 16:
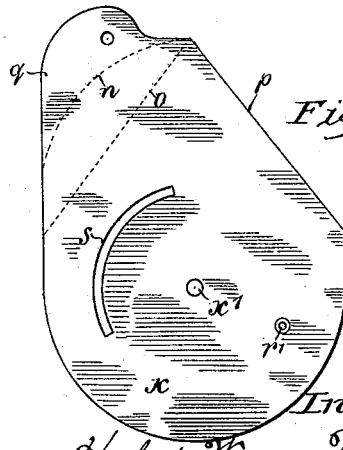
Figure 14:
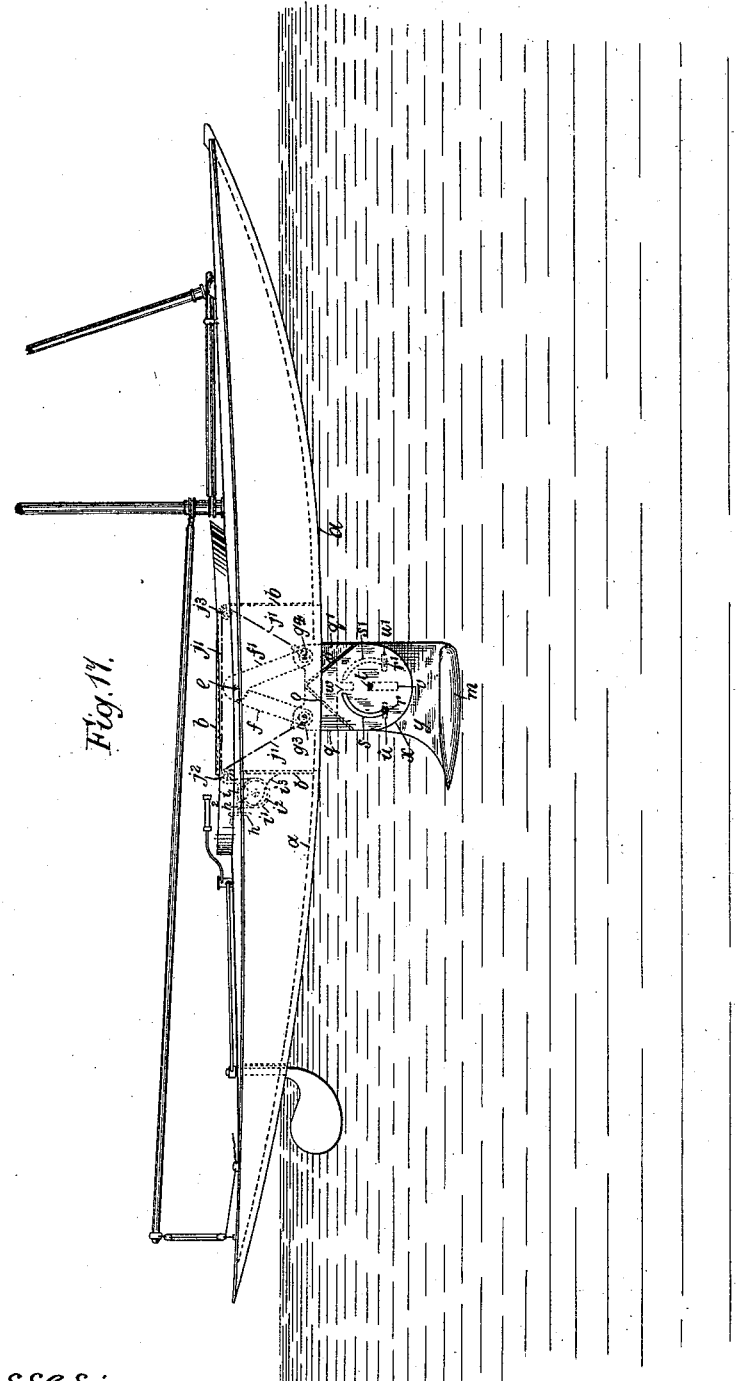

The plates $x$ and $z$ are held to the plate $y$ and to each other by the following devices:

$t$ is the stud above mentioned as passing through the vertical slot $v$ and serving as the axis of the outer plates $x$ and $z$. The last-mentioned purpose is achieved by the projection of the ends of the said stud $t$ through a central hole in the respective plate. The one $x'$ in the plate $x$ is shown in Fig. 16.

$s\ s'$ are arcual slots. There is one in each outer plate $x$ and $z$. These slots are of the same size in every respect and are both struck from the axis of the stud $t$ as a center, one arc on each side of the latter when the three plates $x\ y\ z$ are in their respective working positions. The radius of the inner edge of each arc is then equal to the distance of the said axis from the nearest end of either of the horizontal slots $u$ or $u'$.

$r\ r'$ are a pair of studs, one of which is made fast to each side plate $x\ z$ at the same distance from the axis of the stud $t$ as the radius of an arcual slot $s$ or $s'$, but on the opposite side thereof, in order that it may pass through the respective slot $u$ or $u'$ in the middle plate $y$, as well as engage in the slot $s$ or $s'$, as the case may be, in the plate $x$ or $z$ on the opposite side of the middle plate.

$q\ q'$ are stop-plates—one on each outer plate. A stop-plate is fixed to the top outer corner of a plate in a plane parallel with the latter and of a sufficient distance from it to receive the respective corner of the middle plate between them. The operative part of each stop-plate is its diagonal edge $p$. The abutment on the opposite outer plate with which a stop-plate engages is the diagonal edge $o$ in the adjacent corner of the centerboard, both abutment and stop being cut to the same angle and positioned on their respective outer plates so as to engage when the said centerboard is down, as illustrated in Fig. 11.

$n$ is a distance-piece between each outer plate and its stop-plate. Its inner edge is concaved to clear the top outer corner of the middle plate $y$.

A centerboard made according to the present invention is housed by winding in the chains $j\ j'$. As the bottom ends of the levers $f\ f'$ are pulled up and apart the outer plates $x$ and $z$ are turned on their common pivot $t$, the studs $r\ r'$ lifting the middle plate $y$, moving during such lift first outward along the respective horizontal slot $u$ or $u'$, as the case may be, and up the lower portion of the arcual slot $s$ or $s'$, as the case may be, and afterward back along the said horizontal slots and through the remaining portions of the arcual slots.

The weight of the centerboard suffices to lower itself when the chains are paid out.

A suitable stop is provided in connection with the mechanism for working the housing and lowering gear, adapted to lock the centerboard in any particular position.

I claim—

1. In combination, the housing, the levers or links $f,\ f'$, having their upper ends pivoted therein, the drop-keel, the links or plates pivotally connected together and having their upper ends pivotally connected with the links $f,\ f'$, and the drop-keel connected to the lower ends of said links or plates and means for operating the levers $f,\ f'$, substantially as described.

2. In combination, the housing, the links or levers $f,\ f'$, the drop-keel consisting of two parts pivoted together, the levers or plates pivoted together and having their upper ends pivotally connected to the levers $f,\ f'$, and their lower ends pivotally connected to the two parts of the drop-keel, and the means for operating the levers $f,\ f'$, substantially as described.

In witness whereof I have hereunto affixed my signature, in presence of two witnesses, this 21st day of January, 1895.

HERBERT WYNNE FAIRBRASS.

Witnesses:
HENRY H. LEIGH,
T. F. BARNES.